United States Patent [19]

Goldstein et al.

[11] Patent Number: 5,713,154
[45] Date of Patent: Feb. 3, 1998

[54] APPARATUS FOR HEATING A GREENHOUSE

[75] Inventors: Joel Gilon Goldstein, Jerusalem; Arie Kenig, Eilot, both of Israel

[73] Assignee: Biosolar Technologies Ltd., Jerusalem, Israel

[21] Appl. No.: 555,071

[22] Filed: Nov. 8, 1995

[30] Foreign Application Priority Data

Nov. 10, 1994 [IL] Israel ......................... 111593

[51] Int. Cl.$^6$ ................................................. A01G 9/00
[52] U.S. Cl. ................................................. 47/17; 47/1.01
[58] Field of Search ..................... 47/17 R, 17 EC, 47/48.5, 58, 1.01; 62/94, 271

[56] References Cited

U.S. PATENT DOCUMENTS

| | | | |
|---|---|---|---|
| 1,687,229 | 10/1928 | Riedel | 47/17 EC |
| 3,383,179 | 5/1968 | Tibbitts | 47/17 EC X |
| 3,398,481 | 8/1968 | Lake | 47/17 EC X |
| 4,020,989 | 5/1977 | Kautz | 47/17 EC X |
| 4,699,316 | 10/1987 | Johnson | 47/17 EC X |
| 4,981,021 | 1/1991 | Assaf | 47/17 EC X |
| 5,299,383 | 4/1994 | Takakura et al. | 47/17 EC X |
| 5,409,508 | 4/1995 | Erickson | 47/17 EC X |

*Primary Examiner*—Terry Lee Melius
*Assistant Examiner*—Robert Pezzuto
*Attorney, Agent, or Firm*—Oblon, Spivak, McClelland, Maier & Neustadt, P.C.

[57] ABSTRACT

An apparatus for heating a greenhouse and supplying carbon dioxide gas thereto, including a heater burning a hydrocarbon fuel arranged to at least indirectly heat the atmosphere of the greenhouse when required; a cooler for cooling the carbon dioxide produced by operation of the heater; a storage device connected by a gas flow mechanism to receive combustion gas from the heater and to hold the combustion gas having carbon dioxide produced by the operation thereof; a distribution mechanism supplying the stored carbon dioxide gas containing combustion gas from the storage device to the greenhouse atmosphere, and a distribution control mechanism for allowing a supply of the carbon dioxide gas at a predetermined time and flow rate.

16 Claims, 3 Drawing Sheets

APPARATUS FOR HEATING A GREENHOUSE

BACKGROUND OF THE INVENTION

1. Field of the Invention

The present invention relates to an apparatus for heating a greenhouse and enriching its atmosphere with carbon dioxide.

More particularly, the invention provides means to capture and store the carbon dioxide contained in the combustion gases of a hydrocarbon-fueled greenhouse heater, and to supply said carbon dioxide from a storage vessel or envelope to the greenhouse atmosphere at the optimum time, as determined by horticultural considerations.

2. Dicussion of the Background

Greenhouses are a well-known means for improving agricultural plant yields, and for allowing cultivation of crops which would not develop as well in open fields. Greenhouses have transparent roofs which trap incoming solar radiation. While the daytime temperature inside the greenhouse enclosure is usually sufficiently high for optimum plant development, greenhouse heaters are commonly used to boost nighttime temperatures so as to prevent crop damage during the winter season.

As is known, plant growth can be very substantially accelerated when such plants are grown in an atmosphere provided with an enhanced carbon dioxide content. For industrial purposes, carbon dioxide gas is readily supplied through the use of commercially-available compressed gas cylinder. However, although it is not expensive, this form of gas supply is not economically viable for use in agriculture, even after making allowance for the advantage of supplying the gas at no higher than ambient temperature.

Greenhouse heating systems of the type having a heater burning hydrocarbon fuels are known. Such systems have arrangements with heat exchangers and secondary media, e.g., air or water, for heating the greenhouse while venting the exhaust gases of said heater to the atmosphere, since the exhaust gases of heavy fuels normally used to power said systems are known to be dangerous to plants. Systems using this principle are described in U.S. Pat. Nos. 3,357,088; 4,830,276 and 5,228,303.

Small carbon dioxide generators based on small combustion systems are also known. However, high temperatures can be harmful to plants and can cause undesirable water evaporation and loss, and therefore, operation of such carbon dioxide generators during the day is problematic in warm climates. Carbon dioxide, however, should be supplied to plants during the day, as sunlight is used in the basic photosynthesis reaction:

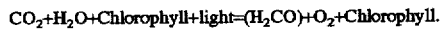

$CO_2 + H_2O + Chlorophyll + light = (H_2CO) + O_2 + Chlorophyll$.

If the heater is not operated during the day, the carbon dioxide in these systems is not available when it is needed.

SUMMARY OF THE INVENTION

It is therefore one of the objectives of the present invention to obviate the disadvantages of the prior art heating and carbon-dioxide enrichment systems, and to provide an apparatus which allows operation of the heater when required, typically at night, and yet supply carbon dioxide to the greenhouse atmosphere when required by the plants, primarily during the day and in sunlight, which combination of nighttime heating, carbon dioxide generation and storage, and subsequent daytime supply of cooled carbon dioxide to the greenhouse, is neither taught nor suggested in the prior art.

It is a further objective of the present invention to provide the required carbon dioxide at a cost substantially lower than that of commercially-supplied gas.

The present invention achieves the above objectives by providing an apparatus for heating a greenhouse and for supplying carbon dioxide gas thereto, comprising: a heater for burning a hydrocarbon fuel arranged to at least indirectly heat the atmosphere of said greenhouse when required; cooling means for cooling the carbon dioxide produced by operation of said heater; storage means connected by gas flow means to receive combustion gas from said heater and to hold carbon dioxide produced by the operation thereof; distribution means for supplying the stored carbon dioxide gas from said storage means to said greenhouse atmosphere, and distribution control means for allowing the supply of said carbon dioxide gas at a predetermined time and flow rate.

In a preferred embodiment of the present invention, there is provided an apparatus for heating a greenhouse and for supplying carbon dioxide gas thereto, further comprising piping inside said greenhouse arranged to allow hot combustion gases from said heater to be circulated within said greenhouse at the time when heating thereof is required, said gases then being transferred after partial cooling for compression and storage.

In a most preferred embodiment of the present invention, an apparatus is provided for heating a ventilated greenhouse and supplying carbon dioxide gas thereto, said heater supplying sufficient carbon dioxide to maintain the carbon dioxide level within said greenhouse substantially above the carbon dioxide level of the outside atmosphere, despite carbon dioxide losses resulting from ventilation due to the excess of carbon dioxide supplied by the heating, which is an order of magnitude higher than necessary for carbon dioxide enrichment. Thus, e.g., there is needed and desired about 30–50 kg carbon dioxide per enclosed dunam per day, while consumption of 150 kg fuel per dunam per night provides 450 kg carbon dioxide per dunam per day.

Therefore, the present system can produce three times as much carbon dioxide as is necessary for providing even 100–150 kg carbon dioxide per dunam per day, for a ventilated greenhouse system.

It will be realized that, in accordance with the present invention, in warm climates and/or when heating is not necessary, the heating system can be run at low load or for only a partial time at night, to generate sufficient carbon dioxide for storage for daytime use, and said generated heat, instead of being directed to the greenhouse, can be simply dissipated to the atmosphere.

It will also be realized that many greenhouses are provided with their own cooling systems, and these cooling systems can be arranged for effecting the cooling of the carbon dioxide produced by operation of said heater.

The invention will now be described in connection with certain preferred embodiments with reference to the following illustrative figures so that it may be more fully understood.

BRIEF DESCRIPTION OF THE DRAWING

With specific reference now to the figures in detail, it is stressed that the particulars shown are by way of example and for purposes of illustrative discussion of the preferred embodiments of the present invention only, and are presented also for providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

BRIEF DESCRIPTION OF THE PREFERRED EMBODIMENTS

Figure 1:
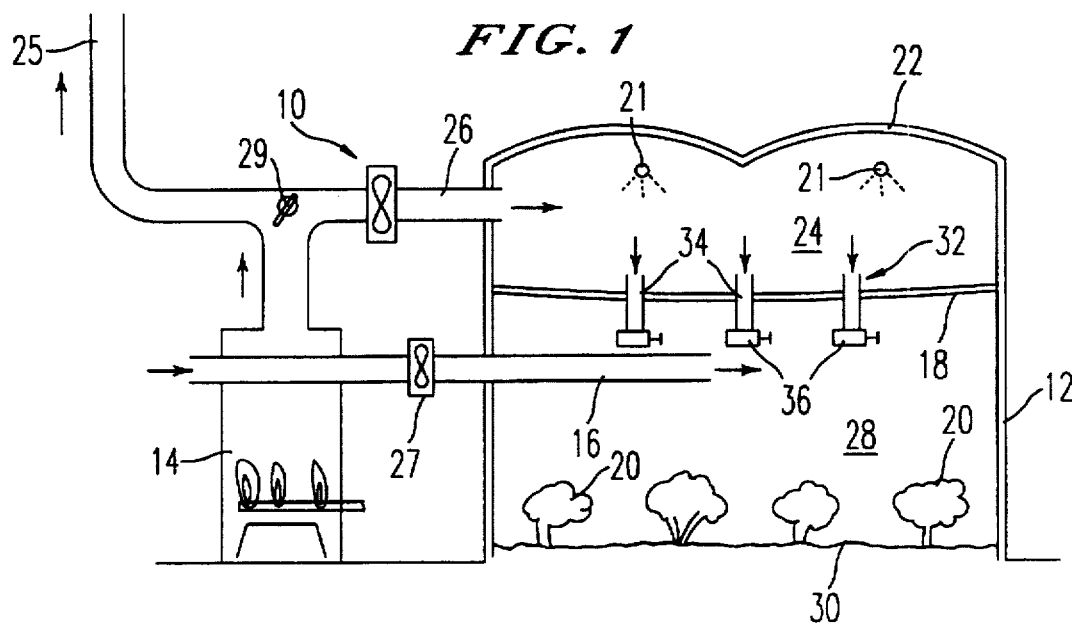
FIG. 1 is a schematic view of a preferred embodiment of the greenhouse heating apparatus of the present invention, provided with low-pressure gas storage.

There is seen in FIG. 1 apparatus 10 for heating a greenhouse 12 and for supplying carbon dioxide gas thereto, either simultaneously or subsequently.

Figure 6:
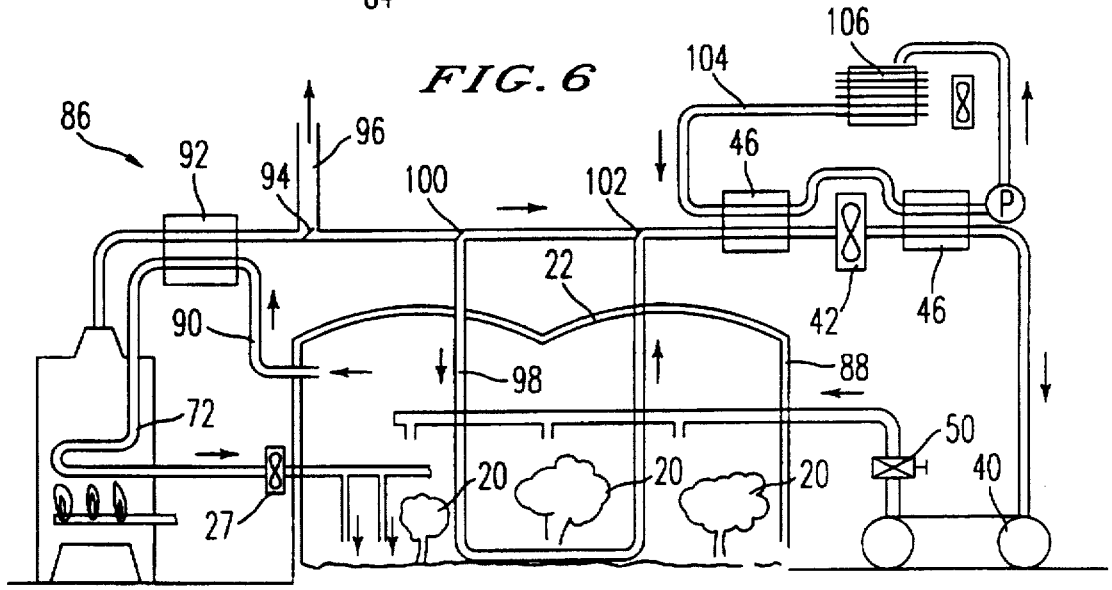
FIG. 6 is a schematic view of an embodiment provided with an air pre-heater and gas coolers to be used before and after compression.

A heater 14 is arranged to burn a hydrocarbon fuel, typically in gaseous form, and thereby to heat the interior of the greenhouse when necessary. The heater 14 shown heats air which is blown into the center of the greenhouse by means of a conduit 16. Other forms of heat distribution are shown in the following embodiments of the invention. The arrangement shown in FIG. 1 is intended to serve a small greenhouse; to serve a large greenhouse, a plurality of conduit branches are provided. Distribution of hot air into the greenhouse 12 will provide ventilation. However, a closed hot air circuit having an air inlet inside the greenhouse, as shown in FIG. 6, may be used when such ventilation is undesirable.

A horizontal plane partition 18 is positioned between the plants 20 and the transparent greenhouse roof 22. Partition 18 is made of a transparent sheet, to allow the passage therethrough of solar radiation. Part of partition 18 is composed of a thin metal foil, to reflect incoming radiation by acting as a thermal curtain when excessive greenhouse radiation is to be prevented. A series of fogger valves 21 are optionally provided, to spray water mist into storage means 24 and thereby to effect evaporative cooling.

The upper volume between plane 18 and roof 22 forms storage means 24, which is connected by gas flow means 26 to receive combustion gas from heater 14 and thereby to hold carbon dioxide produced by its operation. Due to the large size of storage means 24, storage pressure need only be slightly above atmospheric, thus saving compression energy. A light-duty blower 27 drives exhaust gases through the pipe 26 and into the atmosphere of the greenhouse.

Heater exhaust gases which are in excess of carbon dioxide requirements are vented to the atmosphere from the chimney 25. An exhaust control baffle 29 is provided to selectively alter the ratio of gas supplied to the chimney 25 and to the pipe 26.

The lower volume 28 of the greenhouse, formed between the ground 30 and partition 18, receives hot air from conduit 16 and is also provided with a blower 27. Air pressure in volume 28 is lower than the gas pressure in storage means 24. Distribution means 32, in the form of a plurality of short, vertical-axis tubes 34, are provided for supplying the stored carbon dioxide gas from storage means 24 to the greenhouse atmosphere, i.e., to lower volume 28. Control valves 36 in tubes 34 serve as distribution control means, and allow the supply of carbon dioxide gas at a predetermined flow rate, e.g., at a constant flow, for example, via valve means independent of storage pressure and positioned in appropriate spaces above different planted areas of said greenhouse, for predetermined periods of time during the day.

Figure 2:
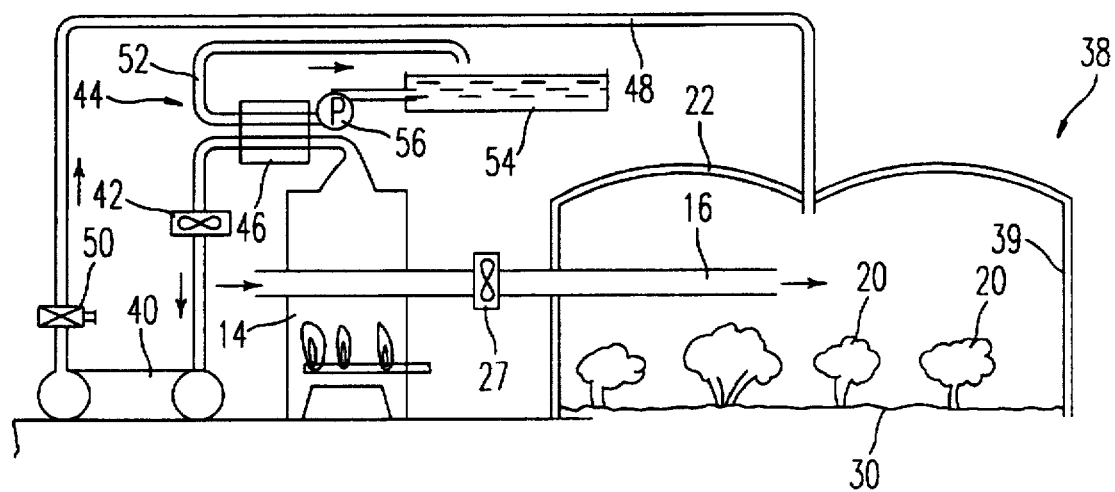
FIG. 2 is a schematic view of a greenhouse heating apparatus provided with medium-pressure gas storage.

With reference now to FIG. 2, there is shown a further embodiment 38 of apparatus for heating a greenhouse 39 and for supplying carbon dioxide gas to same. Carbon dioxide is held, until required, in at least one elastomeric container 40. Container 40, as shown, is a butyl rubber hollow torus. Gas blower 42 is arranged to force said carbon dioxide gas into container 40.

While not shown, container 40 can alternatively be placed inside the greenhouse to facilitate carbon dioxide distribution during use and to provide internal heating of the greenhouse while the carbon dioxide collected therein cools to the greenhouse temperature.

Embodiment 38 is provided with cooling means 44 for cooling the carbon dioxide produced by the operation of heater 14. The carbon dioxide passes through heat exchanger 46 before entering container 40, the gas to be stored thereby taking up a smaller storage volume at a moderate storage pressure of about 0.1–0.5 atmospheres, which is suitable for container 40. Distributor tube 48 connects container 40 to greenhouse 39, and a control valve 50 in tube 48 allows supply of carbon dioxide when required. The heat exchanger 46 shown is water-cooled in a circuit 52, which includes an evaporation pool 54 and circulation pump 56.

Figure 3:
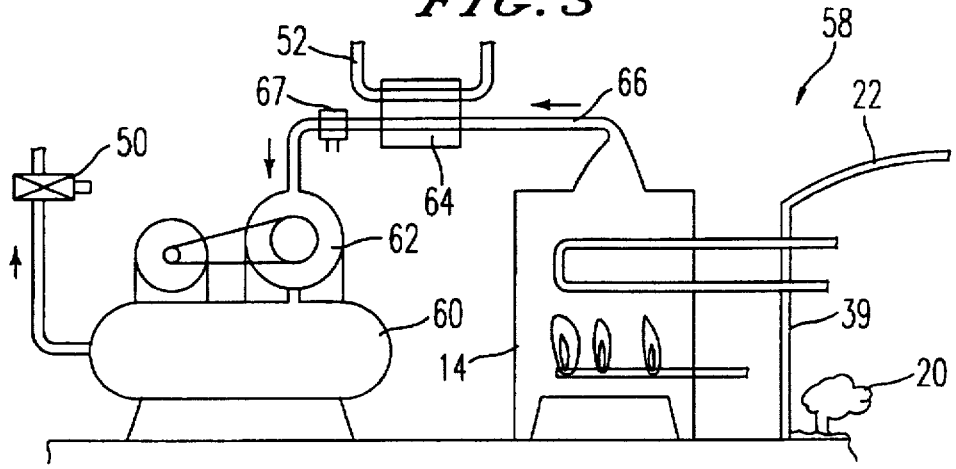
FIG. 3 is a schematic view of a greenhouse heating apparatus provided with high-pressure gas storage.

FIG. 3 shows an embodiment 58, which is similar to embodiment 38 except that the carbon dioxide is stored at a higher pressure and in smaller volume. Embodiment 58 has storage means comprising a steel pressure vessel 60. A gas compressor 62 is arranged to force the carbon dioxide into vessel 60, storage pressure typically being above 5 atmospheres. High-pressure storage is particularly advantageous where gas storage space is expensive or unavailable. A heat exchanger 64 comprises cooling means, and is positioned within flow path 66 of the carbon dioxide, arranged to cool the carbon dioxide before it enters into compressor 62, thus facilitating compression and allowing storage of a larger quantity of carbon dioxide gas than would be possible without cooling. A water separator 67 is provided downstream from the heat exchanger 64, to remove water formed in the cooled gas before the gas enters the compressor 62.

Figure 4:
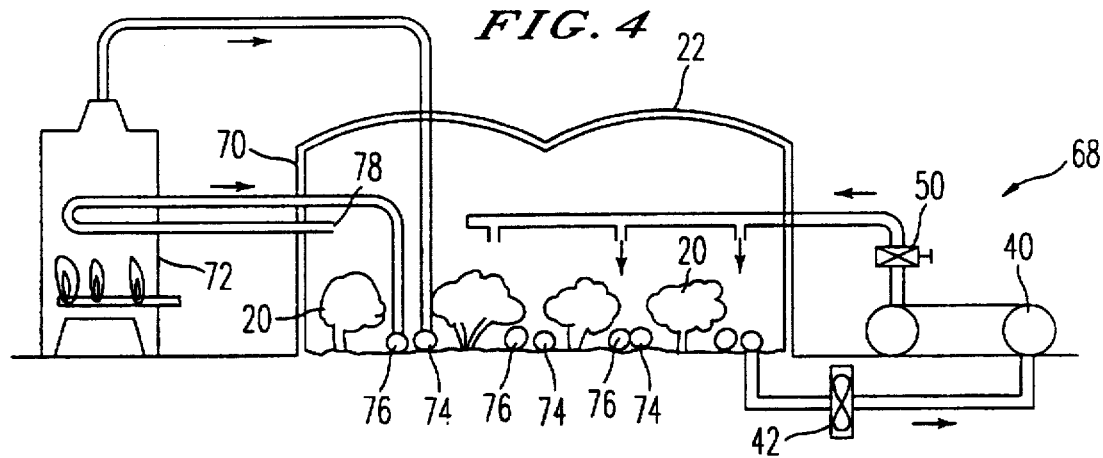
FIG. 4 is a schematic view of an embodiment which uses exhaust gases for heating the greenhouse.

In FIG. 4, there is shown apparatus 68, which uses heater exhaust gases for additional heating of the greenhouse 70 when the heater 72 is in operation. A first piping array 74 inside greenhouse 72 is arranged to allow the circulation of hot combustion gases from heater 72 at a time when heating of the greenhouse is required. A second piping array 76 is provided for distributing hot air from furnace 72. The air inlet 78 of array 76 is inside greenhouse 70, which is intended to be unventilated. Heating fuel economy is thereby improved, while at the same time the combustion gases are cooled and are therefore more easily compressed and stored in container 40.

Figure 5:
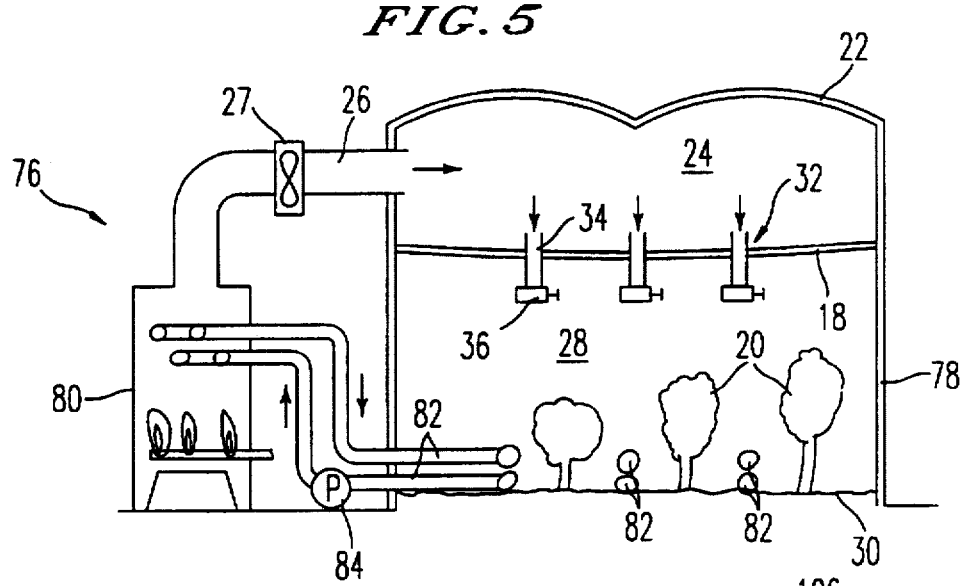
FIG. 5 is a schematic view of an embodiment which uses hot water as a second heating media for heating the greenhouse.

Referring now to FIG. 5, there is seen an apparatus 76, which is similar to apparatus 10 but has arrangements for the even distribution of heat throughout the large greenhouse 78. The greenhouse heater comprises a hot water boiler 80, piping 82 and water circulation pump 84, which circulates hot water in greenhouse 78 at the time when heating is required.

FIG. 6 illustrates apparatus 86, which has arrangements to distribute heat evenly throughout a large greenhouse 88. Apparatus 86 is similar to apparatus 68 shown in FIG. 4, but has several additional improvements which will be described below.

Greenhouse heater 72 comprises a hot air furnace, hot air piping 90, and an air preheater 92, which extracts unwanted heat from the exhaust gases and uses this heat to warm the air used to heat the greenhouse 88. Piping 90 includes a blower 27. Exhaust control baffle 94 is provided to selectively alter the amount of exhaust gas going to discharge chimney 96, the remainder thereof being used in the carbon dioxide system. An additional circuit 98 passes hot exhaust gases through greenhouse 88 to heat the same when required. Two futher baffles 100, 102 control the hot gas flow through circuit 98. A blower 42 slightly compresses the exhaust gases before they are transferred to storage in flexible container 40. A cooling circuit 104 cools the gases both before and after compression, but requires only a single fan-cooled radiator 106 to disperse the extracted heat into the atmosphere.

Figure 7:
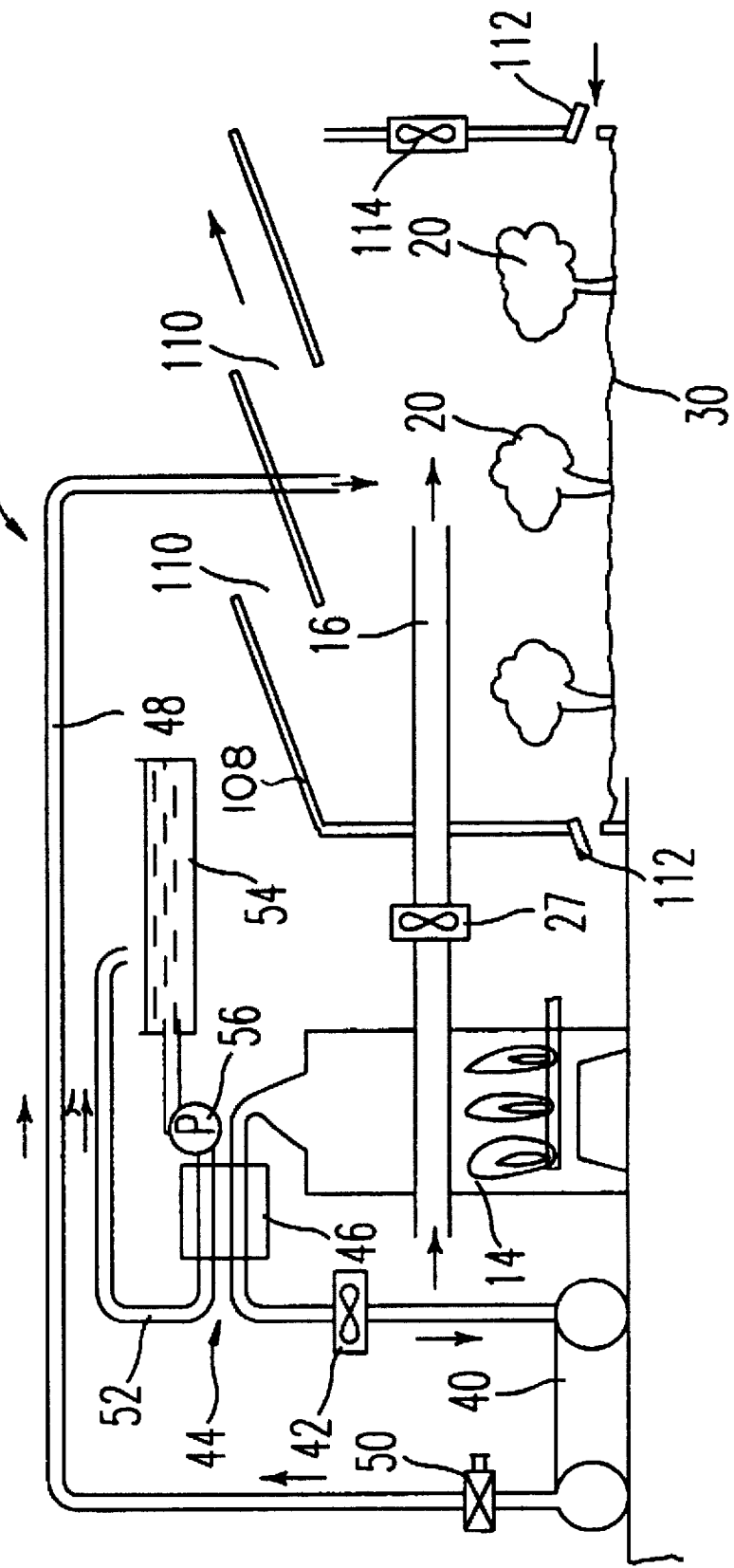
FIG. 7 is a schematic view of a ventilated and heated greenhouse.

FIG. 7 depicts a ventilated greenhouse 108, provided with apparatus 38, as described above with reference to FIG. 2. Heater 14 provides sufficient carbon dioxide to the greenhouse 108 to maintain the carbon dioxide content of the greenhouse interior substantially above the carbon dioxide content of the outside atmosphere, despite carbon dioxide losses resulting from ventilation.

Greenhouse 108 is naturally ventilated by allowing the escape of hot air through roof vents 110 and allowing ingress of cold air through low wall vents 112. When the apparatus 10 is in use for heating, the hot air driven into greenhouse 108 through conduit 16 provides adequate ventilation. At other times, additional ventilation is available by use of through-the-wall, electrically-powered ventilators 114.

It will be evident to those skilled in the art that the invention is not limited to the details of the foregoing illustrated embodiments and that the present invention may be embodied in other specific forms without departing from the spirit or essential attributes thereof. Thus, e.g., in the figures described hereinabove, the secondary media for effecting heating of the greenhouses is air; however, it will be realized that water can also be used by methods known per se. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An apparatus for heating a greenhouse and for supplying carbon dioxide gas thereto, comprising:
    a heater for burning a hydrocarbon fuel arranged to at least indirectly heat the atmosphere of said greenhouse when required;
    cooling means for cooling carbon dioxide containing combustion gas produced by operation of said heater;
    storage means connected by gas flow means to receive carbon dioxide containing combustion gas from said heater and to hold said combustion gas, said combustion gas comprising carbon dioxide produced by the operation of said heater;
    distribution means for supplying the stored carbon dioxide containing combustion gas from said storage means to said greenhouse atmosphere, and
    distribution control means including control valves for daytime supplying of said carbon dioxide containing gas for predetermined periods only during daytime and at a flow rate determined by said distribution control means.

2. Apparatus as claimed in claim 1, wherein said storage means comprises at least one elastomeric container;
    said apparatus being further provided with a gas blower and arranged to force carbon dioxide into said container.

3. Apparatus as claimed in claim 1, wherein said storage means comprises a steel pressure vessel;
    said apparatus being further provided with a gas compressor and arranged to force carbon dioxide into said vessel.

4. Apparatus as claimed in claim 3, further comprising cooling means positioned in a flow path of said carbon dioxide through said gas flow means, arranged to cool said carbon dioxide before said carbon dioxide enters said compressor.

5. Apparatus as claimed in claim 1, further comprising piping located inside said greenhouse, arranged to allow hot combustion gases from said heater to be circulated within said greenhouse at the time when heating thereof is required, said gases then being transferred for compression and storage.

6. Apparatus as claimed in claim 1, wherein said heater comprises a hot water boiler, and further including piping for circulating hot water in said greenhouse at the time when heating thereof is required.

7. Apparatus as claimed in claim 1, wherein said heater comprises a hot air furnace, and further including piping for circulating hot air in said greenhouse at the time when heating thereof is required.

8. A ventilated greenhouse, provided with apparatus as claimed in claim 2, said heater providing sufficient carbon dioxide to said greenhouse to maintain the carbon dioxide content of the interior thereof substantially above the carbon dioxide content of the outside atmosphere, despite carbon dioxide losses resulting from ventilation.

9. An apparatus heating a greenhouse and supplying carbon dioxide thereto, comprising:
    a heater burning a hydrocarbon fuel arranged to at least indirectly heat the atmosphere of said greenhouse when required;
    a cooler cooling carbon dioxide containing combustion gas produced by operation of said heater;
    a storage device connected by a gas flow mechanism to receive carbon dioxide containing combustion gas from said heater and to hold said combustion gas, said combustion gas comprising carbon dioxide produced by the operation of said heater;
    a distribution mechanism supplying the stored carbon dioxide containing combustion gas from said storage device to said greenhouse atmosphere; and
    a distribution control mechanism including control valves for supplying of said carbon dioxide containing gas only during daytime and at a flow rate determined by the distribution control mechanism.

10. Apparatus as claimed in claim 9, wherein said storage device comprises at least one elastomeric container, said apparatus being further provided with a gas blower arranged to force carbon dioxide into said container.

11. Apparatus according to claim 9, wherein said storage device comprises a metal pressure vessel, said apparatus being further provided with a gas compressor forcing carbon dioxide into said vessel.

12. Apparatus according to claim 11, further comprising a cooling mechanism positioned in a flow path of said carbon dioxide through said gas flow mechanism and arranged to cool said carbon dioxide before said carbon dioxide enters said compressor.

13. An apparatus according to claim 9, further comprising piping located inside said greenhouse and arranged to allow hot combustion gases from said heater to be circulated within said greenhouse at the time when heating thereof is required, said gases then being transferred for compression and storage.

14. Apparatus as claimed in claim 9, wherein said heater comprises a hot water boiler, and further including piping circulating hot water in said greenhouse at the time when heating thereof is required.

15. Apparatus as claimed in claim 9, wherein said heater comprises a hot air furnace, and further including piping circulating hot air in said greenhouse at the time when heating thereof is required.

16. A ventilated greenhouse, provided with an apparatus as claimed in claim 1, said heater providing sufficient carbon dioxide to said greenhouse to maintain the carbon dioxide content of the interior thereof substantially above the carbon dioxide content of the outside atmosphere, despite carbon dioxide losses resulting from ventilation.

\* \* \* \* \*